United States Patent Office 3,749,694
Patented July 31, 1973

3,749,694
STABILIZATION OF TEXTILE FIBERS, FILMS AND OTHER SHAPED OBJECTS OF POLYMERIC ALPHA-OLEFINS
Giuseppe Cantatore, Collescipoli, Terni, and Millo Branchesi, Terni, Italy, assignors to Montecatini Edison S.p.A., Milan, Italy
No Drawing. Filed May 3, 1971, Ser. No. 139,919
Claims priority, application Italy, May 4, 1970, 24,148/70
Int. Cl. C08f 45/62
U.S. Cl. 260—41 R                9 Claims

ABSTRACT OF THE DISCLOSURE

Polymeric compositions based on polyolefins and comprising nickel and sulphur-containing stabilizers are protected against discoloration during processing at high temperatures by incorporating in the compositions a phosphorus derivative having the general formula:

$$X[PO(OR)(OR')]_n$$

in which R and R' which may be the same or different, represent hydrogen, alkyl radicals containing from 1 to 18 carbon atoms, or aryl or alkaryl radicals containing from 6 to 18 carbon atoms; X is an alkyl, aryl, alkylaryl, acyl radical of valency $n$, which may contain a heteroatom such as O, S, N, P and the like, and substituent groups such as hydroxy, alkoxy, phenoxyalkyl, carbalkoxy, acyl, amino, alkylamino, arylamino, alkylmercapto. An exemplary phosphorus derivative within the scope of the invention is diethylbenzyl-phosphonate.

The stabilization against heat, light and ageing of fibers, films, raffia and other manufactured articles based on alphaolefin polymers, in particular of articles formed of polypropylene consisting essentially of isotactic macromolecules, is disclosed.

THE PRIOR ART

Polyolefins, and more particularly polypropylene, undergo a certain degradation during processing under heat, especially in the presence of atmospheric oxygen. Manufactured articles of the polyolefins are sensitive to the action of light and heat treatments.

According to the prior art, the degrading effect of light is considerably reduced by incorporating small quantities of various additives including metal compounds, in particular compounds containing nickel.

Numerous nickel derivatives of different organic compounds have been used as stabilizers against the action of light on the polyolefins. Included are the nickel derivatives of sulphides, sulphoxides and sulphones of p-alkylphenols, of the o-oxyacids, of the alpha-amino acids, of the phosphonic acids derived from substituted phenols, of the o-oxyaldehydes, of the alpha- and beta-ketoximes, of the o-hydroxyphenylbenzotriazols, of the o-hydroxybenzophenones, of the dithiophosphates and of other compounds.

The nickel stabilizers have the drawback that processing of the compositions containing them at temperatures above 250° C. is accompanied by discoloration of the compositions. The higher the processing temperature, the deeper the dark coloration of the resulting compositions.

The drawback is particularly evidenced when the compositions comprise stabilizing sulphur-containing compounds such as, for instance, dialkyl-thiodipropionates, 4,4'-thiobis(6 - tert. butyl-m-cresol), inorganic pigments based on cadmium sulphide, and the like.

The intensity of the discoloration, (depth of the dark color), depends also on the concentration of the sulphur-containing additive and the processing temperature.

Italian Pat. No. 722,173 discloses and claims the use of alkyl, aryl, or alkylaryl phosphites as additives suitable for hindering undesirable coloring of polyolefin compositions containing stabilizing nickel compounds. However, the additives of the Italian patent are not completely satisfactory when nickel additive is associated with sulphur-containing compounds.

The discoloring (darkening) phenomenon which is observed is attributed to the reaction between the nickel derivatives and the sulphur-containing compounds, a reaction which leads to the formation of black nickel sulphide (see J. E. Bonkowiski, "Textile Research J.," vol. 39, p. 246, 1969).

THE PRESENT INVENTION

The primary object of this invention was to provide new polymeric compositions based on alpha-olefin polymers, and more particularly on polypropylene consisting essentially of isotactic macromolecules, and fibers, films, raffia and other manufactured articles formed of or comprising the alpha-olefin polymers, which contain nickel stabilizers and sulphur-containing additives, and which can be processed at high temperatures without the development of a dark color therein.

Another object was to provide a method for hindering the development of a dark color in the compositions and manufactured articles during processing thereof.

These and other objects have been achieved, in accordance with this invention, by adding to the polyolefinic compositions containing nickel compounds and sulphurized additives, a phosphorus derivative as defined in the foregoing Abstract Of Disclosure.

Examples of phosphorus derivatives suitable for use in practicing our invention include: the compounds wherein R and R', equal to or different from each other, are hydrogen or methyl, ethyl, n-propyl, iso-propyl, n-butyl, iso-butyl, n-hexyl, n-octyl, 2-ethylhexyl, n-decyl, n-dodecyl, n-tetradecyl, n-hexadecyl, n-octadecyl phenyl, benzyl, and the like radicals; A is methyl, ethyl, n-propyl, n-butyl, isobutyl, n-hexyl, n-octyl, 2-ethylhexyl, n-decyl, n-dodecyl, n-tetradecyl, n-hexadecyl, n-octadecyl, phenyl, benzyl, methylene, ethylene, trimethylene, tetramethylene, hexamethylene, p-phenylene, p-xylylene, 4,6 - dimethyl-m-xylylene, 2,5 - dimethyl-p-phenylene, p-xylylene, 4,6 - dimethyl-m-xylylene, 2,5 - dimethyl-p-xylylene, hydroxymethyl, 1-hydroxyethyl, 1-hydroxybutyl, acetyl, propionyl, benzoyl, methoxymethyl, ethoxymethyl, phenoxymethyl, carbo-methoxymethyl, carbo-ethoxymethyl, 2 - carbo-methoxyethyl, 2 - carbo-ethoxyethyl, thiodimethylene, 2-2-thiodiethylene, ethyl-mercapto-methyl, butyl-mercapto-methyl, 2 - butyl-mercaptoethyl, dimethyl-aminomethyl, diethylaminomethyl, alpha-ethyl-aminobenzyl, pyridyl, piperidyl, piperazyl, and the like radicals.

Particularly suited for our purposes are the following phosphorus derivatives:

diethyl-benzlyphosphonate,
tetraethylethylene-diphosphonate,
tetraethyl-2,5-dimethyl-p-xylylene-diphosphonate,
tris[alpha(diethylphosphono)benzyl)]phosphite, N,N'-bis[alpha(diethyl-phosphono)benzyl]ethylendiamine and the like.

The polyolefin is preferably crystalline polypropylene consisting essentially of isotactic macromolecules, and obtained by polymerizing propylene with stereospecific catalysts. However, equally suited for application according to this invention are the polyolefins obtained from monomers of the general formula:

$$R—CH=CH_2$$

wherein R is either an alkyl or aryl group, or a hydrogen atom, such as polyethylene, polybutene-1, poly-4-methyl-pentene-1, polystyrene and the like.

The compositions may comprise other adjuvants, such as other stabilizers, pigments, dyes, fillers, and substances having the character of anti-acid agents, such as inorganic salts of stearic acid.

The following examples are given to illustrate the invention and are not intended to be limiting.

Examples 1 to 7

Mixes were prepared which consisted of polypropylene formed essentially of isotactic macromolecules (having $[\eta]=1.65$, measured in tetrahydronaphthalene at 135° C.; ash contents=0.0095% and residue after heptane extraction=96.6%), and of 0.5% by weight of nickel-containing stabilizers against light, with or without the phosphorus derivatives used in accordance with this invention.

Small plates were prepared from the mixes using a Carver press and operating respectively at 200° C. with a resting time in the press of 2 minutes, and at 280° and 300° C. for resting times of 10 minutes, under a pressure of 15 kg./cm.$^2$.

The small plates containing the phosphorus derivatives of this invention, after 10 minutes resting time in the press at 280° and 300° C., show an almost unaltered color in comparison with the small plates that had suffered a very mild heat treatment for 2 minutes at 200° C., while, still with respect to these latter, the small plates free of phosphorus derivatives of this invention, after 10 minutes of rest in the press at 280° and at 300° C., appeared heavily blackened.

Tables I and I–A record the 7 examples of mixes together with the data concerning the color variations of the small plates obtained from said mixes following the thermal treatment at, respectively, 200°, 280° and 300° C.

The color of the small plates was measured according to the ASTM D2244–64T standards by means of a BRITTE LV 20 spectrophotocolormeter, according to the "color scale System B1," using as a reference sample magnesium carbonate having the following values of L, a and b:

$$L=95.9,\ a=-0.10,\ b=-0.9$$

The data reported by the examples have the following meaning:

E=difference of color $$\Delta_c = \sqrt{\Delta_a^2 + \Delta_b^2}$$

wherein $\Delta_a$ and $\Delta_b$ are differences in chromaticity.

| Mixes | \multicolumn{7}{c}{Examples} |
|---|---|---|---|---|---|---|---|
| | 1 | 2 | 3 | 4 | 5 | 6 | 7 |
| Polypropylene, percent | 99.5 | 99.2 | 99.5 | 99.2 | 99.2 | 98.65 | 98.35 |
| Nickel phenolphenolate of bis(2-hydroxy-5-tert. octylphenyl) sulphide, percent | 0.5 | 0.5 | | | | | |
| Complex of the nickel salt of bis(2-hydroxy-5-tert. octylphenyl) sulphide with n-butylamine, percent | | | 0.5 | 0.5 | 0.5 | 0.5 | 0.5 |
| 2-hydroxy-4-octoxy-benzophenone, percent | | | | | | 0.5 | 0.5 |
| 3(4-hydroxy-3,5-ditert. butylphenyl) propionate of pentaerithritol, percent | | | | | | 0.10 | 0.1 |
| Thio-dipropionate of lauryl, percent | | | | | | 0.25 | 0.25 |
| Diethyl-benzylphosphonate, percent | | | | 0.3 | | | |
| Tetraethylendiphosphonate, percent | | | | | | | 0.3 |
| Tetraethyl-2,5-dimethyl-p-xylylen-diphosphonate, percent | | | 0.3 | | | | |
| Tris[alpha(diethylphosphono) benzyl] phosphite, percent | | | | | 0.3 | | |

TABLE I-A

| Stay time and temperature of plates in the press | Color variations | \multicolumn{7}{c}{Examples} |
|---|---|---|---|---|---|---|---|---|
| | | 1 | 2 | 3 | 4 | 5 | 6 | 7 |
| 2 minutes at 200° C | E | 23.4 | 21.0 | 18.5 | 18.5 | 18.2 | 34.6 | 37.9 |
| | $\Delta_c$ | 10.6 | 10.6 | 7.7 | 8.9 | 11.7 | 28.6 | 32.6 |
| 10 minutes at 280° C | E | 53.2 | 15.6 | 35.2 | 17.6 | 15.8 | 54.4 | 28.5 |
| | $\Delta_c$ | 10.9 | 9.7 | 10.8 | 8.9 | 11.1 | 14.1 | 24.3 |
| 10 minutes at 300° C | E | 71.0 | 15.4 | 58.8 | 19.2 | 15.7 | 71.2 | 25.9 |
| | $\Delta_c$ | 2.6 | 8.8 | 4.8 | 8.6 | 9.8 | 1.7 | 20.7 |

Examples 8 to 15

For these tests, the mixes used consisted of polypropylene formed essentially isotactic macromolecules, of stabilizers based on nickel and cadmium sulphide with or without the phosphorus derivatives of this invention. Small test plates of the mixes were prepared as described in Examples 1–7.

Table II records the 8 examples of such mixes and the values of E and $\Delta_c$, measured according to ASTM D2244–64T standards on the small plates obtained from the mixes.

TABLE II

| Mixes | \multicolumn{8}{c}{Examples} |
|---|---|---|---|---|---|---|---|---|
| | 8 | 9 | 10 | 11 | 12 | 13 | 14 | 15 |
| Polypropylene, percent | 99 | 98.7 | 99 | 98.7 | 99 | 98.7 | 99 | 98.7 |
| Nickel phenolphenolate of bis-(2-hydroxy-5-tert. octylphenyl) sulphide, percent | 0.5 | 0.5 | | | | | | |
| Complex of the nickel salt of bis-(2-hydroxy-5-tert. octylphenyl) sulphide with n-butylamine, percent | | | 0.5 | 0.5 | | | | |
| Nickel phenolate of bis-(2-hydroxy-5-tert. octylphenyl) sulphone, percent | | | | | 0.5 | 0.5 | | |
| Nickel salt of monoethyl-4-hydroxy-3,5-ditert. butyl-benzyl-phosphonate, percent | | | | | | | 0.5 | 0.5 |
| Tetraethyl-ethylendiphosphonate, percent | | | | | | | | 0.3 |
| Tetraethyl-2,5-dimethyl-p-xylylene-diphosphonate, percent | | 0.3 | | | | | | |

TABLE II-A

| Mix | Variation in color | \multicolumn{8}{c}{Examples} |
|---|---|---|---|---|---|---|---|---|---|
| | | 8 | 9 | 10 | 11 | 12 | 13 | 14 | 15 |
| N,N'-bis[alpha(diethylphosphono)benzyl]ethylendiamine, percent | | | | | | | | | 0.3 |
| Tris[alpha(diethylphosphono)benzyl]phosphite, percent | | | | | 0.3 | | | | |
| Cadmium sulphide, percent | | 0.5 | 0.5 | 0.5 | 0.5 | 0.5 | 0.5 | 0.5 | 0.5 |
| Stay time and temperature of plates in the press: | | | | | | | | | |
| 2 min. at 200° C | E | 44.0 | 46.0 | 45 | 46.8 | 46.0 | 46.2 | 46.1 | 46.6 |
| | $\Delta_c$ | 36.9 | 39.4 | 39.7 | 42.5 | 40.3 | 40.9 | 42.7 | 42.0 |
| 10 min. at 280° C | E | 64.6 | 46.5 | 63.4 | 46.4 | 60.8 | 46.3 | 67.0 | 46.5 |
| | $\Delta_c$ | 8.1 | 43.0 | 8.7 | 43.6 | 12.7 | 43.1 | 4.3 | 43.7 |
| 10 min. at 300° C | E | 66.8 | 46.6 | 68.3 | 46.7 | 66.8 | 46.2 | 70.0 | 46.4 |
| | $\Delta_c$ | 4.9 | 43.3 | 3.3 | 42.3 | 5.2 | 42.6 | 0.9 | 43.4 |

As is apparent from the data reported in Tables I, I–A, II and II–A, in the absence of the phosphonated additives of this invention, the values of "E" increase considerably with increase in the treating temperature, while the values of $\Delta_c$ tend to drop. On the contrary, in the presence of the phosphonated compounds, both the values of E as well as of $\Delta_c$ tend to remain almost constant with increase in the treating temperature.

By "polypropylene consisting essentially of isotactic macromolecules" is meant a polypropylene as described and claimed in Natta et al. U.S. Pat. No. 3,112,300.

Isotactic macromolecules are also defined in Natta et al. U.S. Pat. No. 2,882,263.

In the compositions of the invention, the nickel stabilizers are present in an amount of from 0.05 to 5% by weight; the sulfur-containing additives are present in an amount of from 0.05 to 5% by weight; and the organic phosphorous derivatives are present in an amount of from 0.05 to 5% by weight, all based on the weight of the total composition.

As will be evident, changes in details may be made in practicing this invention, without departing from its spirit. Therefore, we intend to include in the scope of the appended claims all variations and modifications which will be obvious to those skilled in the art from the description and illustrative working examples given herein.

What we claim are:

1. Polymeric compositions consisting essentially of
(a) a crystalline polyolefin;
(b) agents for stabilizing the polyolefin and selected from the group consisting of (1) the combination of a nickel and sulphur-containing stabilizer selected from the group consisting of nickel phenolates of bis-(p-alkylphenol) sulphides; nickel phenol phenolates of bis-(p-alkylphenol) sulphides; and complexes of nickel phenolates of bis-(p-alkylphenol) sulphides and an amine; with an organic phosphorus derivative selected from the group consisting of diethylbenzylphosphonate;
tetraethylethylendiphosphonate;
tetraethyl-2,5-dimethyl-p-xylylendiphosphonate,
tris-[alpha-(diethylphosphono)-benzyl] phosphite; and
N,N'-bis-[alpha (diethylphosphono)-benzyl] ethylendiamine;

and (2) the combination of cadmium sulphide; a nickel-containing stabilizer selected from the group consisting of the nickel phenolphenolate of bis-(2-hydroxy-5-tert.octylphenyl) sulphide, the nickel phenolate of bis-(2-hydroxy-5-tert.octylphenyl) sulphone; the nickel salt of monoethyl-4-hydroxy-3,5-ditert.butyl-benzyl phosphonate; and the complex the nickel salt of bis-(2-hydroxy-5-tert.octylphenyl) sulphide with n-butylamine; and an organic phosphorus derivative selected from the group consisting of tetraethyl-2,5-dimethyl-p-xylylendiphosphonate,
tetraethyl-ethylendiphosphonate,
tris-[alpha-(diethylphosphono)-benzyl] phosphite and
N,N'-bis-[alpha-(diethylphosphono)-benzyl] ethylene-diamine.

2. Polymeric compositions according to claim 1, in which the agents for stabilizing the polyolefin are a combination of the nickel phenolphenolate of bis-(2-hydroxy-5-tert. octylphenyl) sulphide and tetraethyl-2,5-dimethyl-p-xylylen-diphosphonate.

3. Polymeric compositions according to claim 1, in which the agents for stabilizing the polyolefin are a combination of the complex of a nickel salt of bis-(2-hydroxy-5-tert. octylphenyl) sulphide with n-butyl amine and diethyl-benzyl-phosphonate.

4. Polymeric compositions according to claim 1, in which the agents for stabilizing the polyolefin are a combination of the complex of the nickel salt of bis-(2-hydroxy-5-tert. octylphenyl) sulphide with n-butylamine and tetraethylene-diphosphonate.

5. Polymeric compositions according to claim 1, in which the agents for stabilizing the polyolefin are a combination of the complex of the nickel salt of bis-(2-hydroxy-5-tert. octylphenyl) sulphide with n-butylamine and tris-[alpha (diethyl phosphono)-benzyl] phosphite.

6. Polymeric compositions according to claim 1, in which the agents for stabilizing the polyolefin are a combination of nickel phenolphenolate of bis-(2-hydroxy-5-tert. octylphenyl) sulphide, tetraethyl-2,5-dimethyl-p-xylylene-diphosphonate and cadmium sulphide.

7. Polymeric compositions according to claim 1, in which the agents for stabilizing the polyolefin are the complex of the nickel salt of bis-(2-hydroxy-5-tert. octylphenyl) sulphide with n-butylamine, tris-[alpha(diethylphosphono)-benzyl] phosphite and cadmium sulphide.

8. Polymeric compositions according to claim 1, in which the agents for stabilizing the polyolefin are a combination of nickel phenolate of bis-(2-hydroxy-5-tert. octylphenyl) sulphone, tetraethyl-ethylenediphosphonate, and cadmium sulphide.

9. Polymeric compositions according to claim 1, in which the agents for stabilizing the polyolefin are a combination of the nickel salt of monoethyl-4-hydroxy-3,5-ditert. butyl-benzyl-phosphonate, N,N'-bis-[alpha(diethylphosphono)-benzyl] ethylenediamine, and cadmium sulphide.

References Cited

UNITED STATES PATENTS

| | | | |
|---|---|---|---|
| 3,282,887 | 11/1966 | Soeder | 260—45.75 |
| 3,215,717 | 11/1965 | Foster | 260—45.75 |
| 3,310,575 | 3/1967 | Spivack | 260—45.75 |
| 3,280,070 | 10/1966 | Battista et al. | 260—45.7 |
| 3,270,091 | 8/1966 | Spivack | 260—45.7 |
| 3,177,208 | 4/1965 | Stilz et al. | 260—932 |
| 3,539,531 | 11/1970 | Drake et al. | 260—45.7 |

DONALD E. CZAJA, Primary Examiner

V. P. HOKE, Assistant Examiner

U.S. Cl. X.R.

260—23 H, 45.7 S, 45.7 P, 45.75 N, 45.85 R, 45.9 R

UNITED STATES PATENT OFFICE
CERTIFICATE OF CORRECTION

Patent No. 3,749,694             Dated July 31, 1973

Inventor(s) Giuseppe CANTATORE et al

It is certified that error appears in the above-identified patent and that said Letters Patent are hereby corrected as shown below:

Col. 2, line 16 from below, " 2,5-dimethyl-p-phenylene, p-xylyl- " should be deleted.

line 15 from below, " ene, 4,6-dimethyl-m-xylylene " should be deleted.

[ NOTE: 2,5-dimethyl-p-phenylene is a misprint and p-xylylene and 4,6-dimethyl-m-xylylene are printed twice. ]

Col. 4, line 2 under the heading " Examples 8 to 15, " the word - - - of - - - should appear between " essentially " and " isotactic ".

Signed and sealed this 31st day of December 1974.

(SEAL)
Attest:

McCOY M. GIBSON JR.           C. MARSHALL DANN
Attesting Officer             Commissioner of Patents